(12) United States Patent
Porter

(10) Patent No.: US 9,581,830 B2
(45) Date of Patent: *Feb. 28, 2017

(54) COLLAPSIBLE EYEGLASS APPARATUS

(71) Applicant: VisOptical, LLC, Fenton, MO (US)

(72) Inventor: David R. Porter, St. Louis, MO (US)

(73) Assignee: VISOPTICAL, LLC, Fenton, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/080,306

(22) Filed: Mar. 24, 2016

(65) Prior Publication Data

US 2016/0223831 A1 Aug. 4, 2016

Related U.S. Application Data

(63) Continuation of application No. 14/136,308, filed on Dec. 20, 2013, now Pat. No. 9,310,623.

(51) Int. Cl.
*G02C 5/08* (2006.01)
*G02C 5/00* (2006.01)
*G02C 5/20* (2006.01)

(52) U.S. Cl.
CPC ............ *G02C 5/006* (2013.01); *G02C 5/08* (2013.01); *G02C 5/20* (2013.01); *G02C 2200/02* (2013.01)

(58) Field of Classification Search
CPC ............. G02C 5/006; G02C 5/08; G02C 5/22
USPC ......................................... 351/63, 41; 2/454
See application file for complete search history.

(56) References Cited

U.S. PATENT DOCUMENTS

| | | |
|---|---|---|
| 1,873,338 A | 8/1932 | Schwab |
| 1,889,664 A | 11/1932 | Jeschke |
| 1,899,664 A | 2/1933 | Blocker |
| 1,936,319 A | 11/1933 | Wingate |
| 2,071,331 A | 2/1937 | Callahan |
| 2,275,999 A | 3/1942 | Strauss |
| 3,361,514 A | 1/1968 | Davis |
| 3,476,466 A | 11/1969 | Hopkins |
| 4,367,929 A | 1/1983 | Fortini |
| 4,707,088 A | 11/1987 | Tabacchi |
| 4,720,186 A | 1/1988 | Douillard |
| 4,840,476 A | 6/1989 | Rooney |
| 5,007,728 A | 4/1991 | Magorien |
| 5,448,317 A | 9/1995 | Huang |
| 5,532,766 A | 7/1996 | Mateer et al. |

(Continued)

FOREIGN PATENT DOCUMENTS

GB 612577 A 11/1948

*Primary Examiner* — Hung Dang
(74) *Attorney, Agent, or Firm* — Armstrong Teasdale LLP

(57) ABSTRACT

An eyeglass apparatus comprises left and right eyeglass portions and a link. The link is configured to permit the eyeglass apparatus to transition between an extended configuration and a collapsed configuration. In the extended configuration, the eyeglass apparatus is adapted to be worn by a user in a conventional eyeglass wearing orientation. In the collapsed configuration: an inwardly facing lens face of one of left and right lenses faces an outwardly facing lens face of the other of the left and right lenses; a medial edge portion of the left lens is closer to a medial edge portion of the right lens than to a lateral edge portion of the right lens; and the lateral edge portion of the left lens is closer to the lateral edge portion of the right lens than to the medial edge portion of the right lens.

20 Claims, 5 Drawing Sheets

(56) References Cited

U.S. PATENT DOCUMENTS

| | | |
|---|---|---|
| 5,633,692 A | 5/1997 | Schleger et al. |
| 5,937,681 A | 8/1999 | Myhr et al. |
| 6,017,119 A | 1/2000 | Huang |
| 6,048,062 A | 4/2000 | Chow |
| 6,053,612 A | 4/2000 | MacIntosh, Jr. et al. |
| 6,315,408 B1 | 11/2001 | Huang |
| 6,406,144 B1 | 6/2002 | Waters |
| 6,409,335 B1 | 6/2002 | Lipawsky |
| 6,709,127 B2 | 3/2004 | Lu |
| D492,712 S | 7/2004 | Holmes et al. |
| 6,783,236 B2 | 8/2004 | Chou |
| 7,165,838 B1 | 1/2007 | Sapp |
| 7,399,077 B2 | 7/2008 | McDermott et al. |
| 7,452,069 B2 | 11/2008 | Lipawsky |
| 7,455,402 B2 | 11/2008 | Gerber et al. |
| 7,520,606 B2 | 4/2009 | Hogen et al. |
| 7,651,217 B2 | 1/2010 | Welchel et al. |
| 7,740,353 B2 | 6/2010 | Jannard |
| 8,028,350 B2 | 10/2011 | Hogen et al. |
| 8,292,427 B2 | 10/2012 | Zelazowski |
| 8,833,933 B1 | 9/2014 | Huang |
| 9,310,623 B2 * | 4/2016 | Porter .................... G02C 5/006 |
| 2004/0032652 A1 | 2/2004 | Holmes et al. |
| 2004/0100615 A1 | 5/2004 | Conner |
| 2004/0141148 A1 | 7/2004 | Chou |
| 2005/0253998 A1 | 11/2005 | McDermott et al. |
| 2008/0002143 A1 | 1/2008 | McDermott et al. |
| 2008/0036962 A1 | 2/2008 | Alitowski |
| 2010/0073625 A1 | 3/2010 | Engstrom |
| 2010/0073626 A1 | 3/2010 | Engstrom |
| 2012/0162597 A1 | 6/2012 | Porter |
| 2014/0268005 A1 | 9/2014 | Pluta |

* cited by examiner

COLLAPSIBLE EYEGLASS APPARATUS

CROSS-REFERENCE TO RELATED APPLICATIONS

This application is a Continuation of U.S. patent application Ser. No. 14/136,308 filed Dec. 20, 2013, now U.S. Pat. No. 9,310,623, the contents of which are hereby expressly incorporated by reference in its entirety.

STATEMENT REGARDING FEDERALLY SPONSORED RESEARCH OR DEVELOPMENT

Not Applicable.

APPENDIX

Not Applicable.

BACKGROUND OF THE INVENTION

Field of the Invention

This invention pertains to collapsible eyeglasses.

SUMMARY OF THE INVENTION

One aspect of the invention is an eyeglass apparatus comprising a left eyeglass portion, a right eyeglass portion, a link operatively connected to the left and right eyeglass portions, a left temple member, and a right temple member. The left eyeglass portion comprises a left lens. The right eyeglass portion comprises a right lens. Each of the left and right lenses includes a medial edge portion, a lateral edge portion, an upper edge portion, a lower edge portion, an inwardly facing lens face, and an outwardly facing lens face. The link is configured to permit the eyeglass apparatus to transition between an extended configuration and a collapsed configuration. The left temple member is hingedly connected to the left eyeglass portion and right temple member being hingedly connected to the right eyeglass portion. The extended configuration is a configuration in which: (a) the eyeglass apparatus is adapted to be worn by a user in a conventional eyeglass wearing orientation, the conventional eyeglass wearing orientation being an orientation in which the inwardly facing lens faces of the left and right lenses generally face left and right eyes, respectively, of the user and the outwardly facing lens faces of the left and right lenses generally face away from the left and right eyes, respectively; (b) the medial edge portions of the left and right lenses are generally between the lateral edge portion of the left lens and the lateral edge portion of the right lens. The collapsed configuration is a configuration in which: (a) the inwardly facing lens face of one of the left and right lenses faces the outwardly facing lens face of the other of the left and right lenses; (b) the medial edge portion of the left lens is closer to the medial edge portion of the right lens than to the lateral edge portion of the right lens; and (c) the lateral edge portion of the left lens is closer to the lateral edge portion of the right lens than to the medial edge portion of the right lens.

Another aspect of the invention is an eyeglass apparatus comprising a left eyeglass portion, a right eyeglass portion, and a link operatively connected to the left and right eyeglass portions. The left eyeglass portion comprises a left lens, and the right eyeglass portion comprises a right lens. Each of the left and right lenses includes a medial edge portion, a lateral edge portion, an upper edge portion, a lower edge portion, an inwardly facing lens face, and an outwardly facing lens face. The link is configured to permit the eyeglass apparatus to transition between an extended configuration and a collapsed configuration. The extended configuration is a configuration in which: (a) the eyeglass apparatus is adapted to be worn by a user in a conventional eyeglass wearing orientation. The conventional eyeglass wearing orientation is an orientation in which the inwardly facing lens faces of the left and right lenses generally face left and right eyes, respectively, of the user and the outwardly facing lens faces of the left and right lenses generally face away from the left and right eyes, respectively; (b) the medial edge portions of the left and right lenses are generally between the lateral edge portion of the left lens and the lateral edge portion of the right lens. The collapsed configuration is a configuration in which: (a) the inwardly facing lens face of one of the left and right lenses faces the outwardly facing lens face of the other of the left and right lenses; (b) the medial edge portion of the left lens is closer to the medial edge portion of the right lens than to the lateral edge portion of the right lens; (c) the left and right lenses are nested together. The link and the left and right eyeglass portions are arranged and configured such that with the eyeglass apparatus in the extended configuration and being worn by a user in the conventional eyeglass wearing orientation, at least one of the left and right eyeglass portions blocks the link from view of a person face-to-face with the user and facing the outwardly facing lens faces of the left and right lenses.

Another aspect of the present invention is an eyeglass apparatus comprising a left eyeglass portion, a right eyeglass portion, and a link operatively connected to the left and right eyeglass portions. The left eyeglass portion comprises a left lens, and the right eyeglass portion comprises a right lens. Each of the left and right lenses includes a medial edge portion, a lateral edge portion, an upper edge portion, a lower edge portion, an inwardly facing lens face, and an outwardly facing lens face. The link is configured to permit the eyeglass apparatus to transition between an extended configuration and a collapsed configuration. One of the left and right eyeglass portions includes a plug and the other of the left and right eyeglass portions includes a socket. The extended configuration is a configuration in which: (a) the eyeglass apparatus is adapted to be worn by a user in a conventional eyeglass wearing orientation, the conventional eyeglass wearing orientation being an orientation in which the inwardly facing lens faces of the left and right lenses generally face left and right eyes, respectively, of the user and the outwardly facing lens faces of the left and right lenses generally face away from the left and right eyes, respectively; (b) the medial edge portions of the left and right lenses being generally between the lateral edge portion of the left lens and the lateral edge portion of the right lens. The collapsed configuration is a configuration in which: (a) the inwardly facing lens face of one of the left and right lenses faces the outwardly facing lens face of the other of the left and right lenses; (b) the medial edge portion of the left lens is closer to the medial edge portion of the right lens than to the lateral edge portion of the right lens; (c) the left and right lenses are nested together. The plug and socket are sized and configured such that the plug is within the socket when the eyeglass apparatus is in the extended configuration.

Further features and advantages of the present invention, as well as the operation of the invention, are described in detail below with reference to the accompanying drawings.

Figure 3:
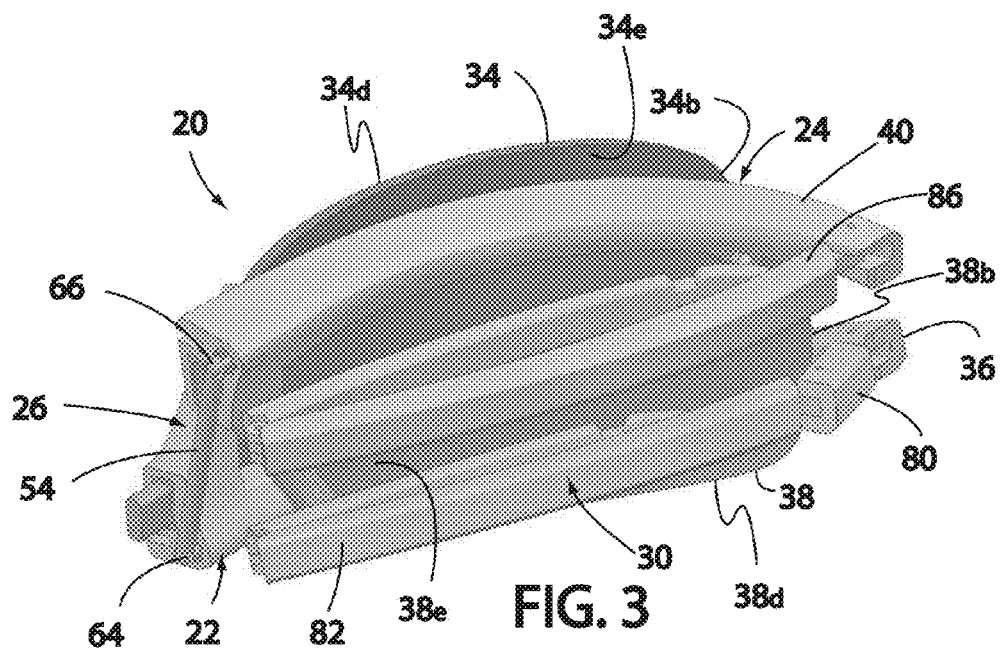
FIG. 3 is a rear perspective view of the eyeglass apparatus of FIG. 2, with the eyeglass apparatus being in the collapsed configuration.

Reference numerals in the written specification and in the drawing figures indicate corresponding items.

DETAILED DESCRIPTION

An embodiment of an eyeglass apparatus in accordance with the present invention is indicated by reference numeral 20 in FIGS. 1-8. The eyeglass apparatus 20 comprises a left eyeglass portion 22, a right eyeglass portion 24, a link 26 operatively connected to the left and right eyeglass portions, a left temple member 30, and a right temple member 32. The left eyeglass portion 22 comprises a left lens 34 and a left frame member 36. The right eyeglass portion 24 comprises a right lens 38 and a right frame member 40. The left and right lenses 34, 38 may be tinted so that the eyeglass apparatus 20 may serve as sunglasses, and/or the left and right lenses may be corrective lenses to improve the vision of a user with near or far vision issues. The left lens 34 includes a medial edge portion $34_a$, a lateral edge portion $34_b$, an upper edge portion $34_c$, a lower edge portion $34_d$, an inwardly facing lens face $34_e$, and an outwardly facing lens face $34_f$. The right lens 38 includes a medial edge portion $38_a$, a lateral edge portion $38_b$, an upper edge portion $38_c$, a lower edge portion $38_d$, an inwardly facing lens face $38_e$, and an outwardly facing lens face $38_f$. The link 26, described in detail below, is configured to permit the eyeglass apparatus 20 to transition between an extended configuration (shown in FIG. 1) and a collapsed configuration (shown in FIGS. 2 and 3). The left temple member 30 is hingedly connected to the left frame member 36 of the left eyeglass portion 22. The right temple member 32 is hingedly connected to the right frame member 40 of the right eyeglass portion 24.

Figure 1:
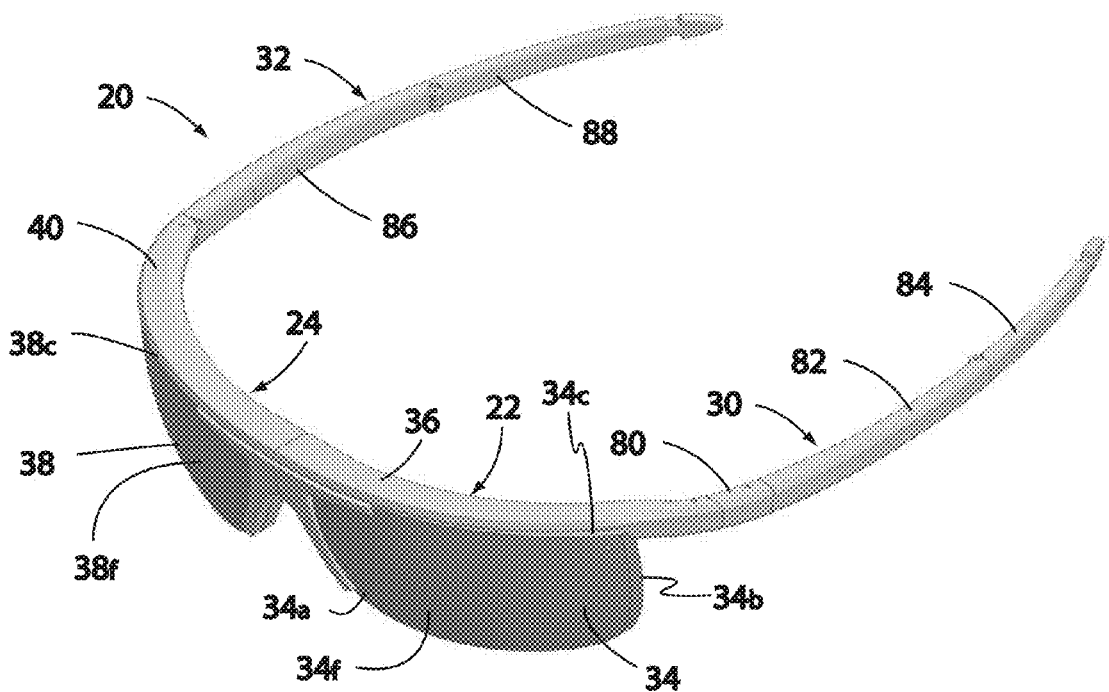
FIG. 1 is a front perspective view of an embodiment of an eyeglass apparatus in accordance with the present invention, the eyeglass apparatus being in an extended configuration, the eyeglass apparatus comprising a left eyeglass portion, a right eyeglass portion, a left temple member, and a right temple member.

As shown in FIG. 1, the extended configuration is a configuration in which the eyeglass apparatus 20 is adapted to be worn by a user in a conventional eyeglass wearing orientation. The conventional eyeglass wearing orientation is an orientation in which the inwardly facing lens faces $34_e$, $38_e$ of the left and right lenses 34, 38 generally face left and right eyes, respectively, of the user (not shown), and the outwardly facing lens faces $34_f$, $38_f$ of the left and right lenses generally face away from the left and right eyes, respectively. In the conventional eyeglass wearing orientation, the medial edge portions $34_a$, $38_a$ of the left and right lenses 34, 38 are generally between the lateral edge portion $34_b$ of the left lens 34 and the lateral edge portion $38_b$, of the right lens 38.

Figure 2:
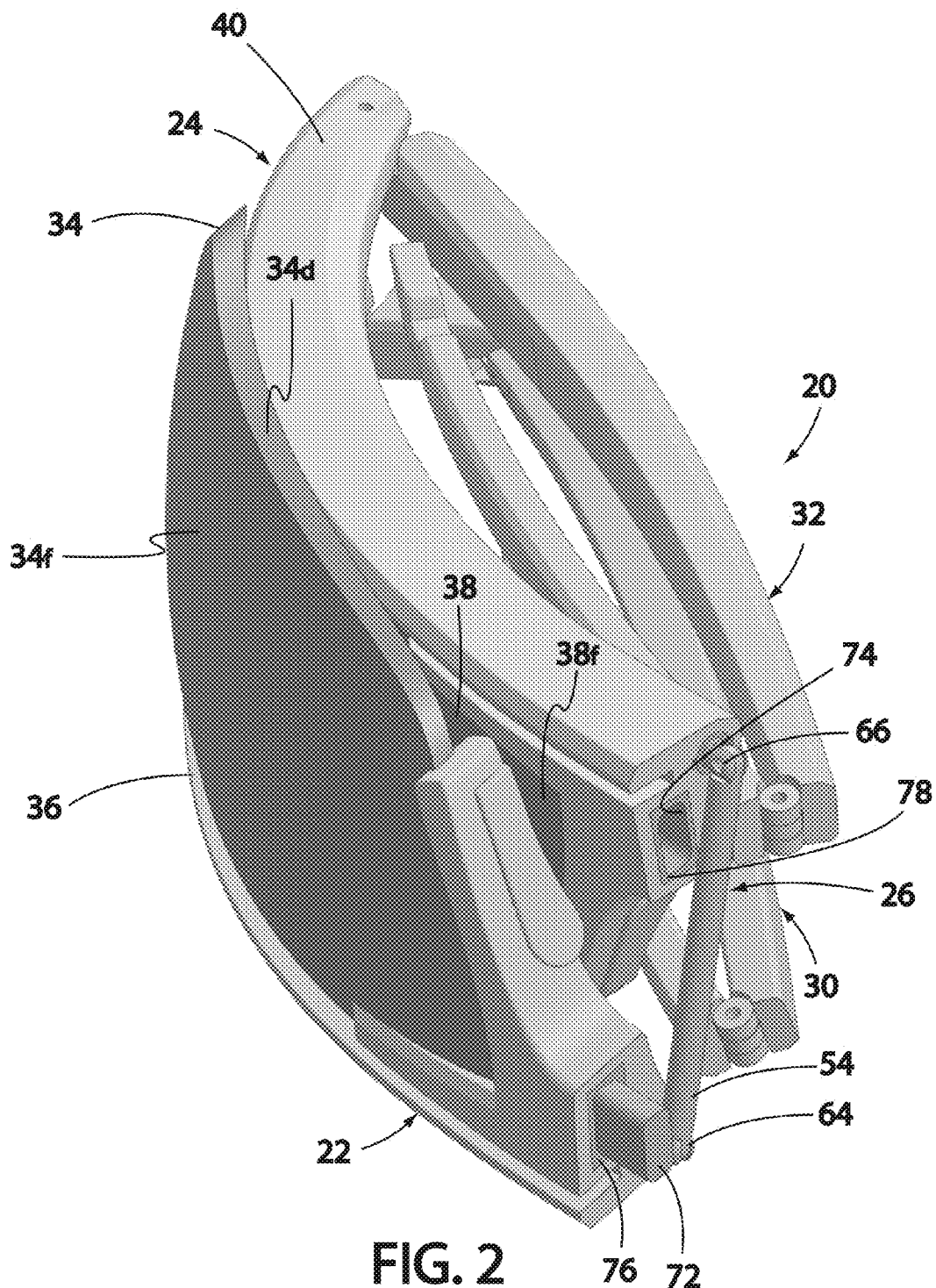
FIG. 2 is a front perspective view of the eyeglass apparatus of FIG. 1, but with the eyeglass apparatus being in a collapsed configuration and revealing a link of the eyeglass apparatus, the link being operatively connected to the left and right eyeglass portions.
Figure 4:
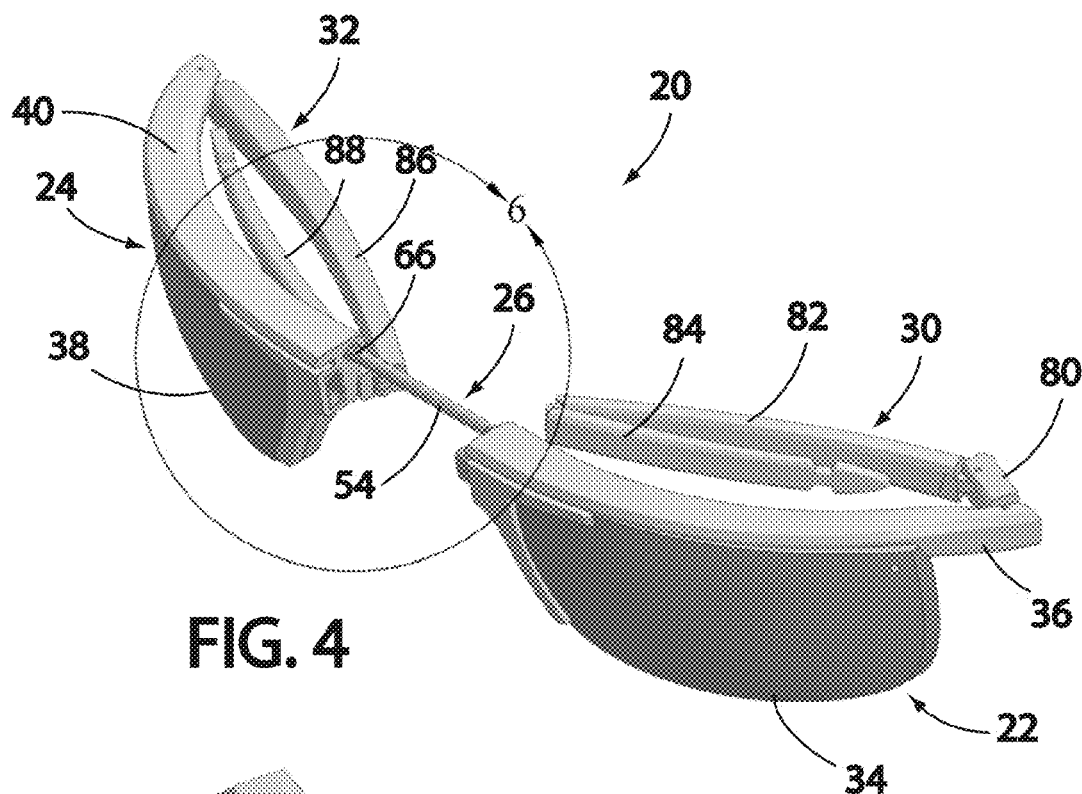
FIG. 4 is a front perspective view of the eyeglass apparatus of FIGS. 1 and 2, but with the eyeglass apparatus being in a first intermediate configuration between the extended configuration and the collapsed configuration.
Figure 6:
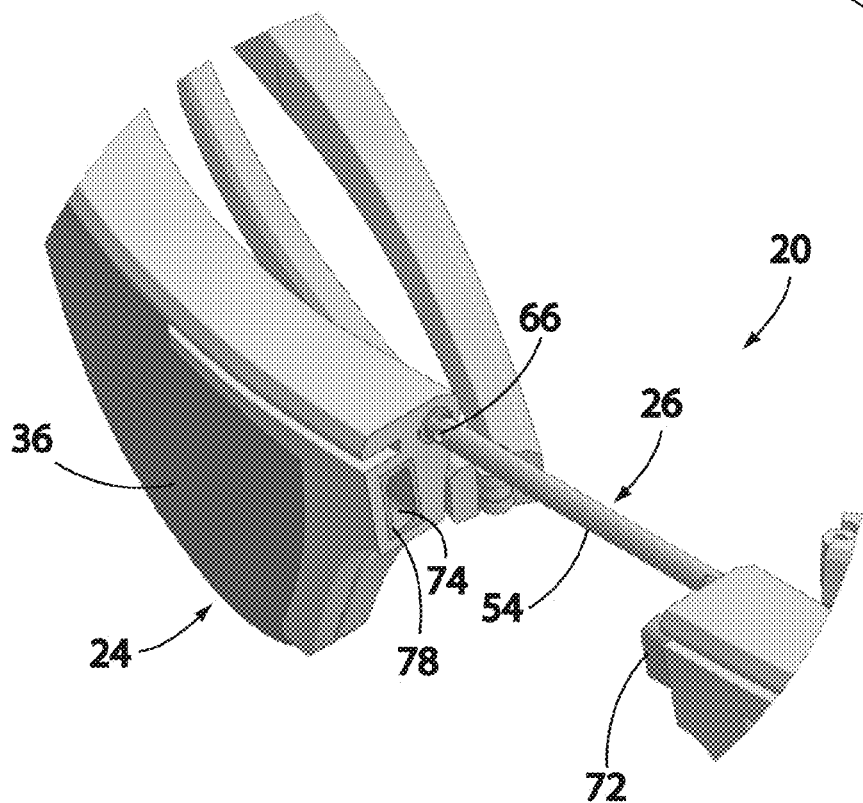
FIG. 6 is an enlarged fragmented front perspective view showing the link in the first intermediate configuration of FIG. 4.
Figure 5:
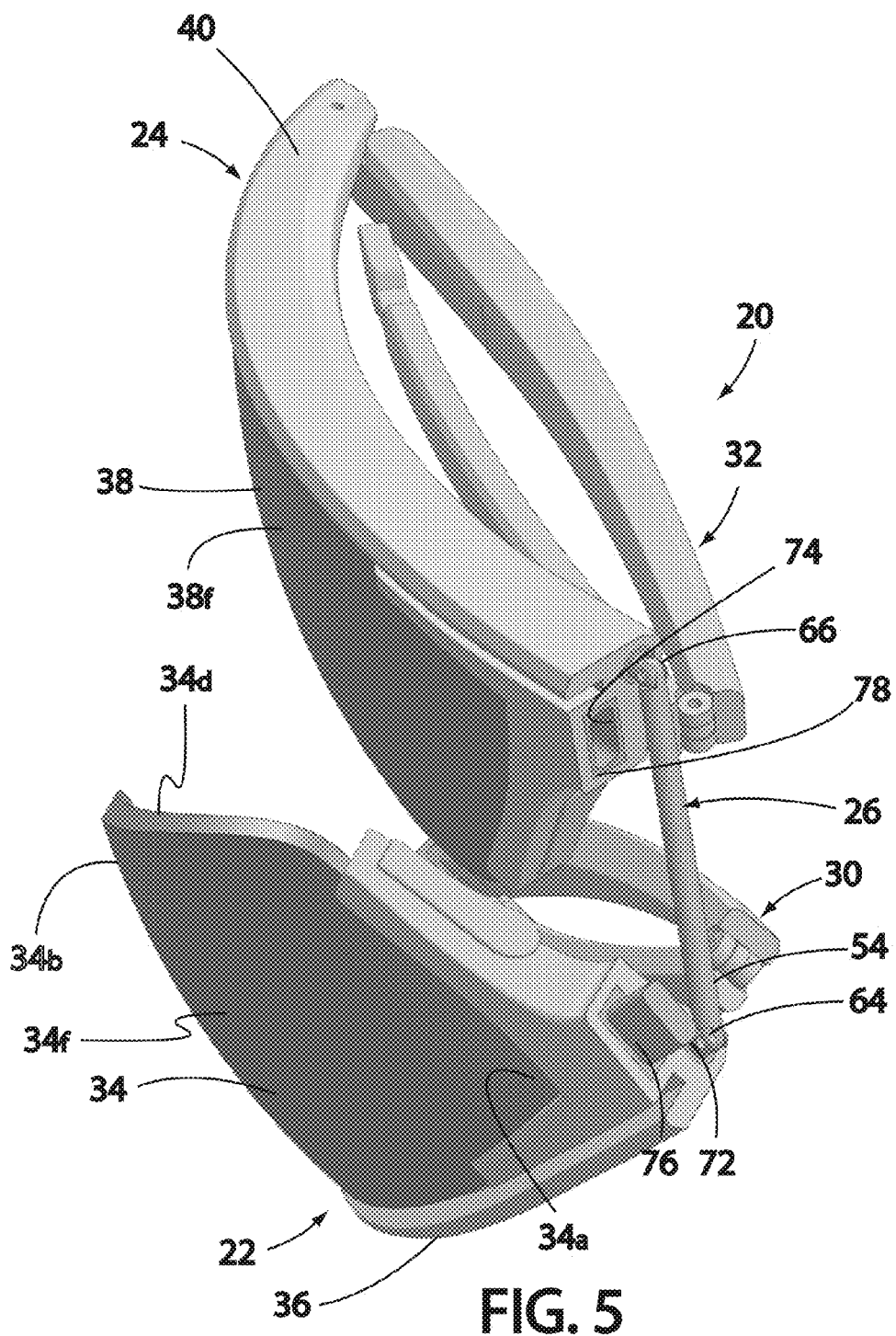
FIG. 5 is a front perspective view of the eyeglass apparatus of FIGS. 1 and 2, but with the eyeglass apparatus being in a second intermediate configuration between the first intermediate configuration and the collapsed configuration.

The collapsed configuration of the present embodiment is a configuration in which the eyeglass apparatus is adapted to be placed in a case or pocket or otherwise stowed by the user. As shown in FIGS. 2 and 3, the collapsed configuration is a configuration in which the inwardly facing lens face $34_e$ of the left lens 34 faces the outwardly facing lens face $38_f$ of the right lens 38, the medial edge portion $34_a$ of the left lens 34 is closer to the medial edge portion $38_a$ of the right lens 38 than to the lateral edge portion $38_b$ of the right lens, and the lateral edge portion $34_b$ of the left lens 34 is closer to the lateral edge portion $38_b$ of the right lens 38 than to the medial edge portion $38_a$ of the right lens. In the collapsed configuration of the present embodiment, the left and right lenses 34, 38 are nested together. Because they are nested together in the collapsed configuration, at least one straight line intersecting the medial and lateral edge portions $34_a$, $34_b$ of the left lens 34 also intersects the right lens 38.

Referring again to FIG. 1, the link 26 and the left and right eyeglass portions 22, 24 are arranged and configured such that when the eyeglass apparatus 20 is in the extended configuration and being worn by a user in the conventional eyeglass wearing orientation, at least one of the left and right eyeglass portions 22, 24 blocks the link 26 from view of a person face-to-face with the user and facing the outwardly facing lens faces $34_f$, $38_f$ of the left and right lenses 34, 38. In the present embodiment, the link 26 and the left and right eyeglass portions 22, 24 are arranged and configured such that the link is fully encased by the combination of the left and right eyeglass portions when the eyeglass apparatus 20 is in the extended configuration.

Figure 7:
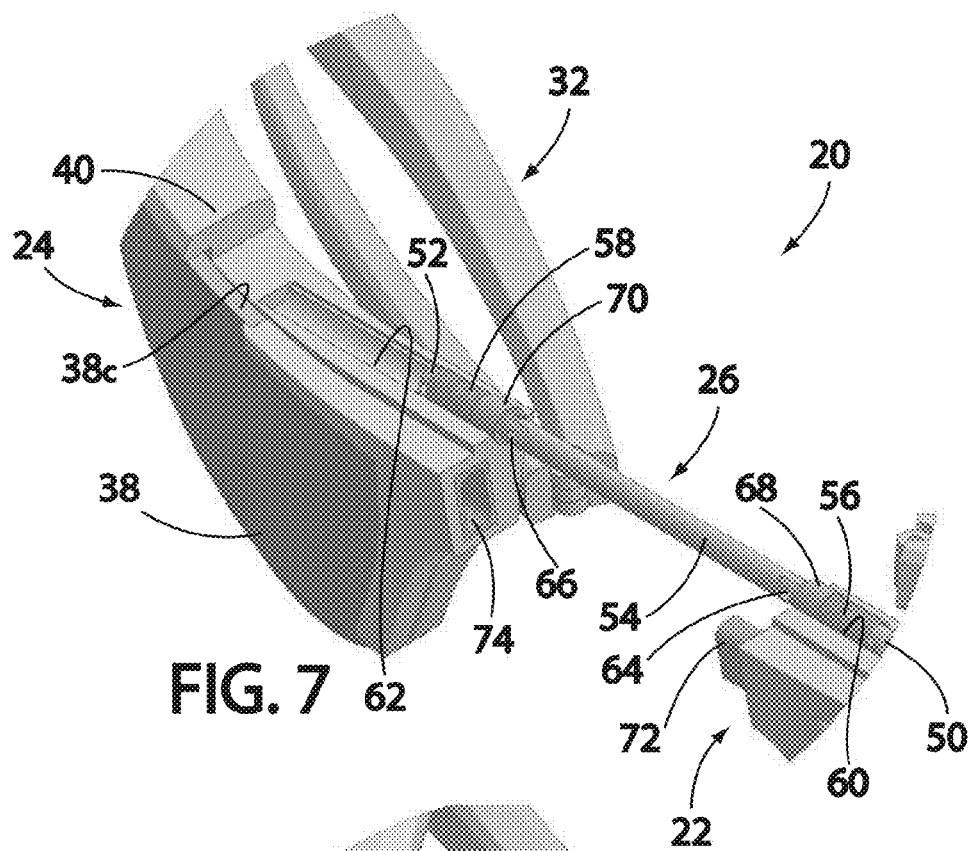
FIG. 7 is an enlarged fragmented front perspective view similar to that of FIG. 6, but with portions of the left and right eyeglass portions being broken away to show details of the link.
Figure 8:
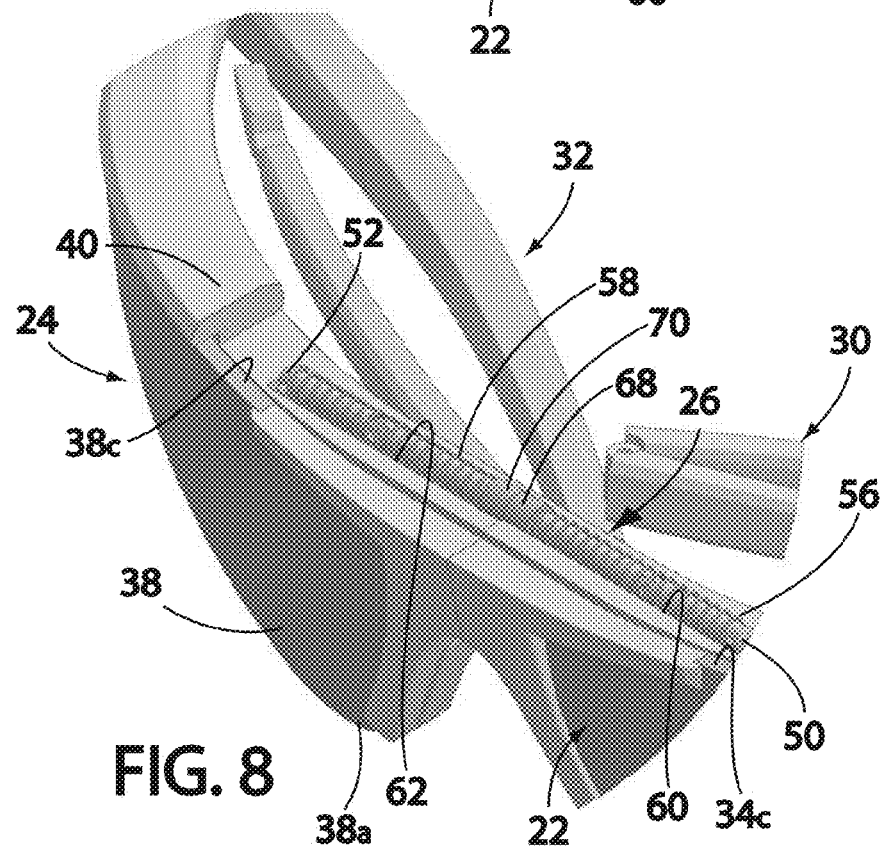
FIG. 8 is an enlarged fragmented front perspective view of the eyeglass apparatus of FIGS. 1 and 2 with portions of the left and right eyeglass portions broken away to show details of the link, but with the left and right eyeglass portions in the extended configuration and the left and right temple members being in folded configurations.

The link 26 of the present embodiment comprises a left slider member 50, a right slider member 52, a connector member 54, a left spring 56, and a right spring 58. The left slider member 50 is slidable within a link receiving hole 60 in the left frame member 36 of the left eyeglass portion 22 for sliding movement within the left link receiving hole between a medial position (shown in FIG. 7) and a lateral position (shown in FIG. 8). Similarly, the right slider member 52 is slidable within a link receiving hole 62 in the right frame member 40 of the right eyeglass portion 24 for sliding movement within the right link receiving hole between a medial position (shown in FIG. 7) and a lateral position (shown in FIG. 8). Referring to FIG. 7, when the left slider member 50 is in its medial position, the left slider member is adjacent the entrance to the left link receiving hole 60. When the right slider member 52 is in its medial position, the right slider member is adjacent the entrance to the right link receiving hole 62. Referring to FIG. 8, when the left slider member 50 is in its lateral position, the left slider member is spaced laterally from the entrance to the left link receiving hole 60. When the right slider member 52 is in its lateral position, the right slider member is spaced laterally from the entrance to the right link receiving hole 62. The left slider member 50 is biased in its lateral position via the left spring 56, and the right slider member 52 is biased in its lateral position via the right spring 58. In other words, the left spring 56 urges the left slider member 50 into the left link receiving hole 60 of the left eyeglass portion 22, and the right spring 58 urges the right slider member 52 into the right link receiving hole 62 of the right eyeglass portion 24. When the eyeglass apparatus 20 is in the extended configuration (FIGS. 1 and 8), the left and right springs 56, 58 urge the left and right eyeglass portions 22, 24 toward one another. A left end of the connector member 54 is hingedly connected to the left slider member 50 via a left hinge 64, and a right end of the connector member is hingedly connected to the right slider member 52 via a right hinge 66. The right link receiving hole 60 and the right slider member 52 are preferably shaped and oriented to inhibit the right slider member from freely rotating in the right link receiving hole, to ensure that that the right hinge 66 is in a proper position to permit the eyeglass apparatus to transition away from and toward its collapsed configuration when the left and right slider members 50, 52 are in their lateral positions. The link 26 also includes left and right restraining sleeves 68, 70. The left restraining sleeve 68 is positioned within the left link receiving hole 60 adjacent the entrance to the left link receiving hole, and the right restraining sleeve 70 is positioned with the right link receiving hole 62 adjacent the entrance to the right link receiving hole. The left restraining sleeve 68 permits the left slider member 50 to slide within the left link receiving hole 60 between its lateral and medial positions, but restrains the left slider member and the left spring 56 from being pulled out of the left link receiving hole. The right restraining sleeve 70 permits the right slider member 52 to slide within the right link receiving hole 62 between its lateral and medial positions, but restrains the right slider member and the right spring 58 from being pulled out of the right link receiving hole.

In the present embodiment, the left eyeglass portion 22 includes a protruding plug 72 and the right eyeglass portion 24 includes a socket 74 sized and configured such that the plug is within the socket when the eyeglass apparatus 20 is in the extended configuration. In the present embodiment, the plug 72 comprises a left magnet member 76 and the socket 74 is formed within a right magnet member 78 secured within the right frame member 36. The left and right magnet members 76, 78 are magnetically attracted to one another when the left and right eyeglass portions 22, 24 of the eyeglass apparatus 20 are in the extended configuration (FIGS. 1 and 8) to urge the left and right eyeglass portions toward one another and thereby releasably maintain the eyeglass apparatus in the extended configuration. It is to be understood that instead of or in addition to comprising magnets, the plug 72 and socket 74 could be shaped for a snug fit of the plug 72 within the socket 74 to thereby releasably maintain the eyeglass apparatus 20 in the extend configuration.

In the present embodiment, the left temple member 30 has first, second, and third left temple pieces, 80, 82, 84. The first left temple piece 80 is hingedly connected to the left frame member 36 of the left eyeglass portion 22, the second left temple piece 82 is hingedly connected to the first left temple piece, and the third left temple piece 84 is hingedly connected to the second left temple piece. The hinged connections of the left temple pieces enable the left temple member 30 to be moved between an unfolded configuration (FIG. 1) and a folded configuration (FIG. 3). The right temple member 32 has first and second right temple pieces, 86, 88. The first right temple piece 86 is hingedly connected to the right frame member 40 of the right eyeglass portion 24, and the second right temple piece 88 is hingedly connected to the first right temple piece. The hinged connections of the right temple pieces enable the right temple member 32 to be moved between an unfolded configuration (FIG. 1) and a folded configuration (FIG. 3).

In operation, the user orients the eyeglass apparatus 20 in the extended configuration when the user desires to wear the eyeglass apparatus in the conventional eyeglass wearing orientation, and the user may desire to orient the eyeglass apparatus in the collapsed configuration when not in use. To transition the eyeglass apparatus 20 from the extended configuration (FIG. 1) to the collapsed configuration (FIGS. 2 and 3), the user first pulls the left and right eyeglass portions 22, 24 laterally away from one another (FIGS. 4, 6 and 7) and moves the left and right temple members 30, 32 to their folded configurations. Pulling the left and right eyeglass portions 22, 24 laterally away from one another causes the left and right slider members 50, 52 to slide from their lateral positions (FIG. 8) to their medial positions (FIG. 7) and causes the left and right hinges 64, 66 to protrude out of their respective link receiving holes 60, 62 and exposes the connector member 54. The left and right eyeglass portions 22, 24 can then be pivoted via the right and left hinges 64, 66 first to the intermediate position shown in FIG. 5 and then to the collapsed configuration as shown in FIGS. 2 and 3. To transition the eyeglass apparatus 20 from the collapsed configuration to the extended configuration, the steps indicated above are reversed.

In view of the foregoing, it should be appreciated that the invention has several advantages over the prior art. The invention enables eyewear of a wrap-around type to be folded or otherwise transitioned between an extended configuration and a collapsed configuration.

As various modifications could be made in the constructions herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

It should also be understood that when introducing elements of the present invention in the claims or in the above description of exemplary embodiments of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations.

What is claimed is:

1. An eyeglass apparatus comprising:
    a left eyeglass portion;
    a right eyeglass portion; and
    a link comprising a first member, a second member, and a connector member connecting said first member and said second member, said first member slidably connected to one of said left eyeglass portion and said right eyeglass portion, said second member connected to the other of said left eyeglass portion and said right eyeglass portion, wherein said connector member is pivotally connected to at least one of said first member and said second member.

2. An eyeglass apparatus in accordance with claim 1, wherein one of said left eyeglass portion and said right eyeglass portion includes a plug and the other of said left eyeglass portion and said right eyeglass portion includes a socket, said plug configured to extend within said socket in a first eyeglass apparatus orientation and configured to be decoupled from said socket in a second eyeglass apparatus orientation.

3. An eyeglass apparatus in accordance with claim 1, wherein said connector member is pivotally connected to said first member and said second member.

4. An eyeglass apparatus in accordance with claim 1, wherein one of said first member and said second member is configured to not rotate with regard to a respective one of said left eyeglass portion and said right eyeglass portion.

5. An eyeglass apparatus in accordance with claim 1, wherein said eyeglass apparatus is configured to transition from a first eyeglass apparatus orientation, in which said left eyeglass portion contacts said right eyeglass portion along a first axis, to a second eyeglass apparatus orientation, in which said left eyeglass portion is spaced from said right eyeglass portion along a second axis that is substantially perpendicular to the first axis.

6. An eyeglass apparatus in accordance with claim 5, further comprising a front and a back, said second axis substantially parallel to a line extending from said front to said back.

7. An eyeglass apparatus in accordance with claim 1, wherein each of said left eyeglass portion and said right eyeglass portion comprises a first side and a second side, said eyeglass apparatus further comprising a left temple member extending from said left eyeglass portion second side and a right temple member extending from said right eyeglass portion second side.

8. An eyeglass apparatus comprising:
a left eyeglass portion;
a right eyeglass portion; and
a link comprising a first member, a second member, and a connector member connecting said first member and said second member, said first member slidably connected to said left eyeglass portion, said second member slidably connected to said right eyeglass portion, wherein said connector member is pivotally connected to at least one of said first member and said second member.

9. An eyeglass apparatus in accordance with claim 8, further comprising a front and a back, wherein said eyeglass apparatus is configured to transition from a first eyeglass apparatus orientation, in which said left eyeglass portion contacts said right eyeglass portion along a first axis, to a second eyeglass apparatus orientation, in which said left eyeglass portion is spaced from said right eyeglass portion along a second axis that is substantially perpendicular to the first axis, and wherein said second axis is substantially parallel to a line extending from said front to said back.

10. An eyeglass apparatus in accordance with claim 9, wherein each of said left eyeglass portion and said right eyeglass portion comprises a first side and a second side, said eyeglass apparatus further comprising a left temple member extending from said left eyeglass portion second side substantially parallel to said second axis, and a right temple member extending from said right eyeglass portion second side substantially parallel to said second axis.

11. An eyeglass apparatus in accordance with claim 8, wherein one of said left eyeglass portion and said right eyeglass portion includes a plug and the other of said left eyeglass portion and said right eyeglass portion includes a socket, said plug configured to extend within said socket in a first eyeglass apparatus orientation and configured to be decoupled from said socket in a second eyeglass apparatus orientation.

12. An eyeglass apparatus in accordance with claim 8, wherein said connector member is pivotally connected to said first member and said second member.

13. An eyeglass apparatus in accordance with claim 8, wherein one of said first member and said second member is configured to not rotate with regard to a respective one of said left eyeglass portion and said right eyeglass portion.

14. An eyeglass apparatus comprising:
a left eyeglass portion comprising a first portion;
a right eyeglass portion comprising a second portion, wherein one of said first portion and said second portion includes a plug and the other of said first portion and said second portion includes a socket, said plug configured to extend within said socket; and
a link comprising a first member, a second member, and a connector member connecting said first member and said second member, said first member slidably connected to one of said left eyeglass portion and said right eyeglass portion, said second member connected to the other of said left eyeglass portion and said right eyeglass portion.

15. An eyeglass apparatus in accordance with claim 14, wherein said plug is configured to extend within said socket in a first eyeglass apparatus orientation and configured to be decoupled from said socket in a second eyeglass apparatus orientation.

16. An eyeglass apparatus in accordance with claim 14, wherein one of said first member and said second member is configured to not rotate with regard to a respective one of said left eyeglass portion and said right eyeglass portion.

17. An eyeglass apparatus in accordance with claim 14, wherein said connector member is pivotally connected to said first member and said second member.

18. An eyeglass apparatus in accordance with claim 14, wherein said second member is slidably connected to said other of said left eyeglass portion and said right eyeglass portion.

19. An eyeglass apparatus in accordance with claim 14, wherein each of said left eyeglass portion and said right eyeglass portion comprises a first side and a second side, wherein said eyeglass apparatus is configured to transition from a first eyeglass apparatus orientation, in which said left eyeglass portion first side contacts said right eyeglass portion first side along a first axis that is substantially parallel to a line extending from said left eyeglass portion second side to said right eyeglass portion second side, to a second eyeglass apparatus orientation, in which said left eyeglass portion is spaced from said right eyeglass portion along a second axis that is substantially perpendicular to the first axis.

20. An eyeglass apparatus in accordance with claim 14, further comprising a left temple member extending from said left eyeglass portion second side substantially perpendicular to said first axis, and a right temple member extending from said right eyeglass portion second side substantially perpendicular to said first axis.

* * * * *